June 24, 1947.  H. L. NEWELL  2,422,974
CONTROL MEANS FOR PRESSURE COOKERS AND THE LIKE
Filed Oct. 11, 1945
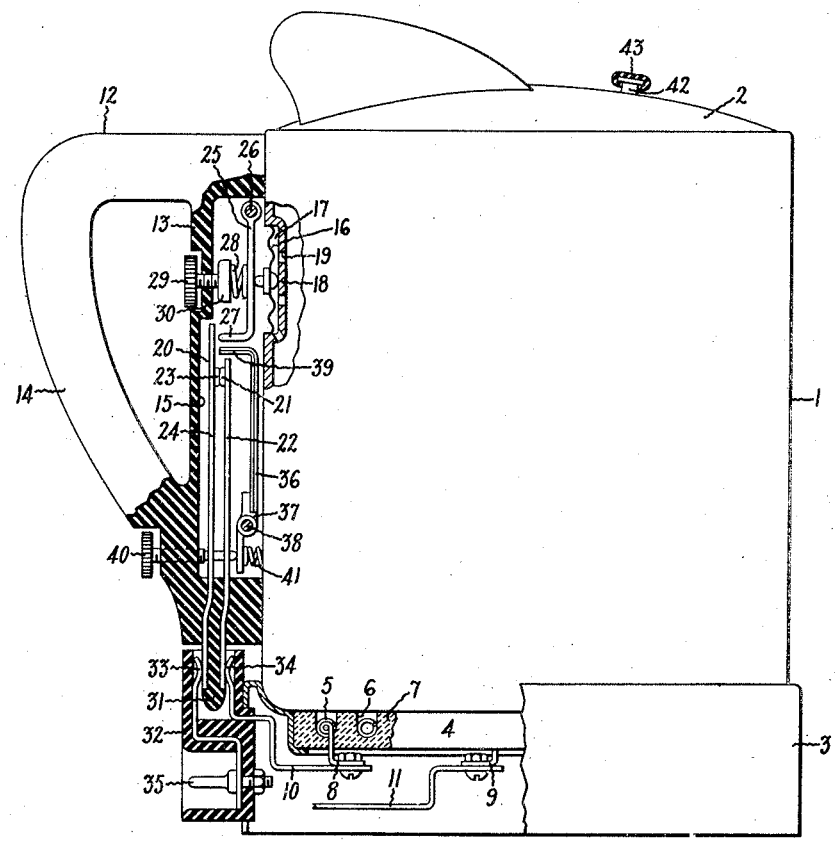
Inventor:
Heber L. Newell,
by Alfred T. Robert
His Attorney.

Patented June 24, 1947

2,422,974

UNITED STATES PATENT OFFICE 2,422,974

CONTROL MEANS FOR PRESSURE COOKERS AND THE LIKE

Heber L. Newell, Bridgeport, Conn., assignor to General Electric Company, a corporation of New York Application October 11, 1945, Serial No. 621,686

5 Claims. (Cl. 219—43)

This invention relates to cookers, more particularly to cookers of the pressure type, and it has for its object the provision of improved means for automatically controlling the heat input to the cooker, whereby it can be operated either under pressure, or non-pressure cooking conditions.

In accordance with this invention, a cooking container is provided which may be tightly closed by means of a removable cover so that the cooker can be operated as a pressure cooker, or which may be operated as a non-pressure cooker by removing the cover from sealing relation with the container. Electrical heating means are provided for the cooker and also pressure responsive means for controlling the heating means to hold a substantially uniform pressure, and thereby cooking temperature, in the cooking container. In addition to this, temperature responsive means responsive to the temperature of the cooker container control the heating means to hold a desired temperature when the device is being operated as a non-pressure device. The temperature responsive means further operates as a safety member when the device is being operated as a pressure cooker.

In one specific embodiment of this invention the pressure responsive and temperature responsive control means are mounted within a closed chamber provided in the handle structure of the cooker. An in this embodiment, the container is removable from a base in which the heater is mounted, and the parts are constructed and arranged so that the control means is connected in the energizing circuit of the heater by the act of placing the container upon the base.

For a more complete understanding of this invention, reference should be had to the accompanying drawing in which the single figure is a side elevation of an electrically heated cooker embodying this invention, parts being shown in section so as to illustrate certain structural details.

Referring to the drawing, this invention has been shown in one form in a pressure cooker having a cylindrical relatively deep cooking container 1. This container is open at the top, but is provided with a cover 2 for closing it. It will be understood that the cover 2 may be operated into sealing relation with the container 1 so as to close it tightly whereby the device may operate as a pressure cooker. Inasmuch as the sealing means may be any conventional sealing means and forms no part of this invention it has not been illustrated.

The cooker container 1 is provided with a base 3 from which it is separable, and in the base 3 there is provided an electric heating unit 4 for heating the bottom wall of the container when it is placed upon the base. The heating unit 4 may be of any suitable type; it has been illustrated as a heater comprising a helical resistance conductor 5 mounted in spiral grooves 6 provided for it in an electrically insulating supporting block 7. The heater is provided with a pair of electrical supply terminals 8 and 9 to which electrical leads 10 and 11 are attached respectively.

The container 1 is provided with a handle structure 12 which has a base 13 that is attached to the side wall of the container in any suitable fashion, and a section 14 forming a closed loop with the base and which is the hand-grasping portion. Preferably the base 13 and the portion 14 will be formed integrally with each other, and of a suitable electrically insulating material such as a molded phenol condensation product.

The walls of the base 13 are constructed and arranged to define a relatively elongated vertically positioned chamber 15 in which suitable control means for the heater 4 is housed. The material of the handle defines the upper and lower and the two side and the outer walls of this chamber, while the inner wall of the chamber is defined by the adjacent side wall of the container 1, as shown.

A part of the control means is responsive to the pressure in the container 1 for controlling the energization of the heating resistance 5 in order to hold a substantially constant cooking pressure, and thereby temperature, in the container 1. This pressure responsive means comprises a flexible diaphragm 16 located in an opening 17 in the top wall of the container so that its inner surface is exposed to the container pressure. Preferably this inner surface will be protected by means of a grille-like cover 18 which, as shown, has apertures 19 which expose the inner face of the diaphragm 16 to the pressure of the container. The diaphragm operates a control switch 20 provided for the heater. The switch 20, as shown, comprises a contact 21 mounted upon a fixed arm 22 and a coacting contact 23 mounted upon a flexible switch arm 24. The two switch arms 22 and 24 are mounted vertically within the chamber 15 in substantially parallel relation, and they have their lower ends molded into the walls of the handle so as to be supported thereby, and whereby they are electrically insulated from each other. The diaphragm 16 operates the switch through an operating arm 25 pivoted to oscillate at its upper end on a shaft 26. The arm, as shown, is provided with an angular extension 27 which is arranged to coact with the upper end of the switch arm 24 which projects upwardly somewhat beyond the contacts 21 and 23. The arm 25 is formed of some suitable electrical insulating material, such as a phenol condensation product. The operating arm 25 is loaded against the diaphragm by means of a compression spring 28 operating against the side of the arm opposite the diaphragm, and the tension of which may be controlled by means of a thumb-screw 29 threaded in the outer wall of the chamber 15 and controlling the position of an abutment 30 for the spring.

The switch is connected in the energizing circuit of the heater 4 through the act of placing the container 1 upon the base 3, and for this purpose the lower ends of the switch arms 22 and 24 project downwardly beyond the bottom wall of the chamber 15, as shown. These lower ends are electrically insulated from each other by a downwardly extending protuberance 31 provided on the bottom wall. The base 3 is provided with an electrically insulating socket 32 in which spaced-apart contact springs 33 and 34 are mounted in such position that when the container 1 is placed upon the base 3, as shown, the lower ends of the switch blades 22 and 24 are received between the springs 33 and 34 and contact them mechanically and electrically, as shown. The socket 32 is formed of any suitable electrically insulating material, such as a phenol condensation product. The contact spring 33 is electrically connected to one terminal 35 of a pair of twin supply terminals, while the contact spring 34 is electrically connected to the lead 10 that is connected to the heater terminal 8. The opposite terminal lead 11 of heater terminal 9 is electrically connected with the other terminal pin of the set 35. Thus when the two terminals 35 are plugged into a supply source, a circuit will be completed for the resistance conductor 5 through the switch blades 22 and 24.

The switch is further controlled by means of a temperature responsive element 36 formed as a bimetallic bar. This bar is relatively elongated and is positioned vertically within the chamber 15 in close thermal relation with the adjacent side wall of the container 1, as shown. The lower end of the bar 36 is attached to a lever 37 which is pivoted upon a transverse shaft 38, while the upper end is provided with an outwardly extending section 39 substantially parallel to the section 27 of the control arm 25 and adapted to operate the switch arm 24. The bimetal blade 36 is positioned with relation to the switch arm by means of a thumb-screw 40 mounted in the handle structure and which bears against the outer side of the lever 37, the lever being loaded against the screw by means of a compression screw 41.

Mounted in the cover 2 is a suitable safety pressure vent 42 which normally is closed by a flexible pressure relief cover 43. It will be understood that in the event of the occurrence of a predetermined excessive pressure in the container 1 the cover 43 will be blown away from the vent 42 to release the pressure.

In the operation of the cooker, it will be understood that when it is desired to operate it as a pressure device, the edibles with the proper amount of water will be placed within the container 1 and then the cover 2 will be moved into sealing relation with the container so as to seal it up. Then when the terminals 35 are plugged into an electrical supply source, the heater resistance 5 will be energized in order to heat the contents of the container and to cause the pressure to rise therein. When the pressure attains a predetermined maximum such as fifteen pounds per square inch, corresponding to a desired cooking temperature, the diaphragm 16 will move the control arm 25 to engage and operate the switch arm 24 to the left and thereby break the contacts 21 and 23. This operation of course will deenergize the heater 5. Following this, the pressure will fall and, as a result, the diaphragm 16 will permit the spring 28 to move the control lever 25 away from the switch arm 24 to permit it to reclose the contacts 21 and 23 and thereby reenergize the heater. In this way the heater is controlled to hold a substantially constant pressure in the container. The thermal response device 36 at this time normally does not function, but if it should happen that the pressure responsive control and the pressure release plug 42, 43 fail, then the thermal element would respond to an abnormal increase in temperature to operate the switch arm 24 to break the heater circuit.

The principal reason however for the thermal control is to control the operation of the heater when the cooker is operated as a non-pressure device. When so operating, it will be understood that the cover 2 will either be removed or it will remain on the cooker, but in non-sealing relation with it. When the cooker is so operated the pressure container 1 is atmospheric, and the switch is controlled solely by the temperature of the walls of the container 1 to which temperature the thermal element 36 responds. When so operated, should the temperature of the container wall rise above a predetermined value the thermal element will deflect to move the switch arm to break the contacts 21 and 23. Following this, the container wall temperature will fall and in response thereto, the element 36 will permit the switch to reclose. In this way the thermal element will hold a substantially constant cooking temperature in the container. The temperature held may be varied by adjusting the thumb-screw 40 which adjusts the position of the thermal element 36 with reference to the switch arm 24.

While I have shown and described a particular embodiment of my invention, it will be obvious to those skilled in the art that various changes and modifications may be made without departing from my invention in its broader aspects and I therefore aim in the appended claims to cover all such changes and modifications as fall within the true spirit and scope of my invention.

What I claim as new and desire to secure by Letters Patent of the United States, is:

1. In a pressure cooking device, a closed cooking container, a separate base for supporting said container and from which the container is removable, an electric heating unit on said base for applying heat to said container, a control switch for said heating unit mounted on said container, means also on said container for operating said switch alternately to heater energizing and deenergizing conditions depending upon the fall and rise of the pressure in said container from a predetermined value, and plug and socket connection elements for connecting said control switch in the energizing circuit of said heating unit, one element mounted on and in fixed relation to said container and the other mounted on and in fixed relation to said unit, said plug element being inserted into said socket element through the act of placing said container on said base.

2. In a pressure cooking device, a closed cooking container, a separate base for supporting said container and from which the container is removable, an electric heating unit on said base for applying heat to said container, a handle structure attached to said container having a chamber therein, switching means for controlling said heating unit mounted within said chamber, pressure responsive operating means for said switching means also mounted within said chamber and operable responsively to the pressure in said container to operate said switching means alternately to heater energizing and deenergizing conditions depending upon the fall and rise of the pressure in said container from a predetermined value, and plug and socket connector elements for connecting said switching means in controlling relation with said heating unit, one element thereof mounted on said handle and the other mounted on said base, said plug element being inserted into said socket element through the act of placing said container on said base.

3. In a pressure cooker, a closed cooking container, an electric heater for heating said container, a handle structure having a base attached to said container and a hand-grasping loop portion attached to said base said base having walls defining a closed chamber, pressure responsive means in said chamber for controlling said heater actuated by the pressure in said container so that said heater is energized and deenergized to hold a substantially constant pressure in said container, and an adjustment element for adjusting said pressure responsive means to vary the pressure held in said container, said element being accessible in the space between said handle base and loop portion.

4. In a pressure cooker, a closed cooking container, an electric heater for heating said container, switch means actuated by the pressure generated in said container controlling the energization of said electric heater to hold a substantially constant pressure in said container, and auxiliary means for operating said switch means responsively to the temperature of said container to operate said switch means to deenergize said heater when said temperature rises beyond a predetermined maximum value.

5. In a pressure cooker, a cooking container, an electric heater for heating said container, a cover for said container for closing it so that it may be operated to cook under pressure, and removable from the container so that the cooker can be operated as a non-pressure cooker, switch means operated by the pressure generated in said container controlling said electric heater to hold a substantially constant pressure in said container, and temperature responsive means responsive to the temperature of said container for operating said switch means responsively to said temperature to hold a substantially uniform temperature in said container when it is being operated as a non-pressure device.

HEBER L. NEWELL.

REFERENCES CITED

The following references are of record in the file of this patent:

UNITED STATES PATENTS

| Number | Name | Date |
| --- | --- | --- |
| 2,392,077 | Wilson | Jan. 1, 1946 |
| 2,194,117 | Graham | Mar. 19, 1940 |
| 2,194,118 | Graham | Mar. 19, 1940 |
| 1,437,119 | Speck | Nov. 28, 1922 |
| 2,209,832 | Schurig | July 30, 1940 |
| 2,266,090 | Smith | Dec. 16, 1941 |
| 2,369,932 | Allen | Feb. 20, 1945 |